United States Patent [19]

Deuser et al.

[11] 4,351,742
[45] Sep. 28, 1982

[54] METHOD FOR THE PRODUCTION OF SYNTHESIS GAS

[75] Inventors: Norbert Deuser; Peter Diemer, both of Essen, Fed. Rep. of Germany

[73] Assignee: Krupp-Koppers GmbH, Essen, Fed. Rep. of Germany

[21] Appl. No.: 256,903

[22] Filed: Apr. 23, 1981

[30] Foreign Application Priority Data

May 2, 1980 [DE] Fed. Rep. of Germany ....... 3016876

[51] Int. Cl.$^3$ .......................... C01B 3/16; C01B 3/38
[52] U.S. Cl. .................................. 252/373; 423/655; 423/656; 165/1; 518/703; 518/704
[58] Field of Search ................ 252/373; 423/655, 656; 165/1; 518/704, 703

[56] References Cited

U.S. PATENT DOCUMENTS 4,161,393  7/1979  Rudolph et al. .................... 423/655
4,235,800  11/1980  Pinto .............................. 252/373 X

*Primary Examiner*—Howard T. Mars
*Attorney, Agent, or Firm*—Michael J. Striker

[57] ABSTRACT

Crude gas obtained through partial oxidation of carbon-containing material is subjected to catalytic conversion in an apparatus containing a moistening-demoistering system connected by means of a combined water circulation. To reduce the required amount of steam and process heating, a partial stream of water coming from the moistener is branched off, heated by indirect heat exchange with converted, hot synthesis gas, and then united with the partial stream of water coming from the demoistener for re-delivery to the moistener.

6 Claims, 1 Drawing Figure

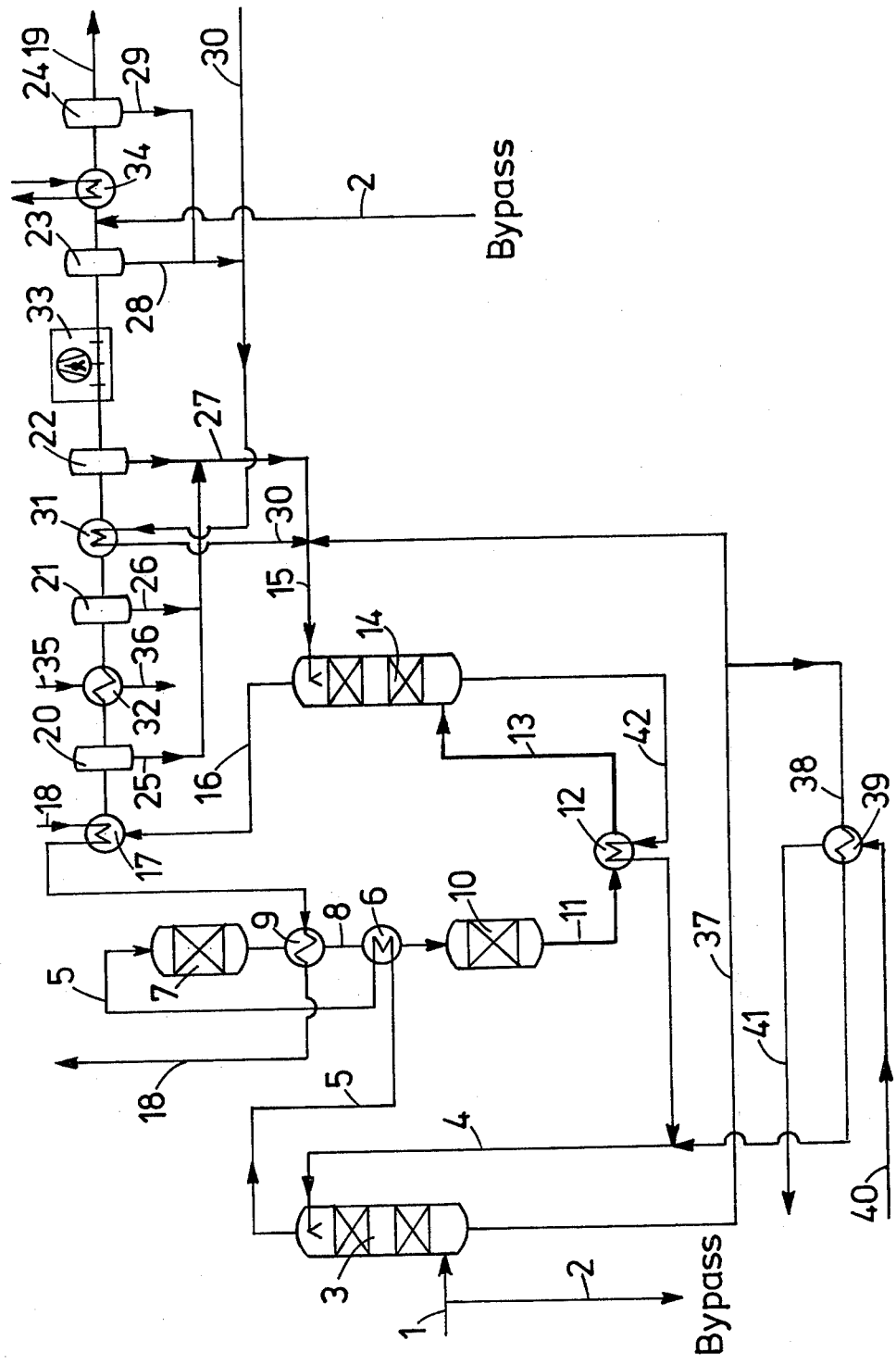

METHOD FOR THE PRODUCTION OF SYNTHESIS GAS

BACKGROUND OF THE INVENTION

The invention concerns a method for the production of synthesis gas, in which the crude gas obtained through partial oxidation (gasification) of carbon-containing material is subjected to a catalytic conversion in a conversion arrangement which displays a moistening-demoistening system connected by means of a combined water circulation.

It is known to proceed with the generation of synthesis gas from carbon-containing material (coal/petroleum), from which initially a crude gas is obtained by partial oxidation (gasification), which thereafter can be worked up through suitable further treatment into synthesis gas for the methanol or ammonia or oxygen syntheses. The generated synthesis gas is composed, depending upon its further applicability, either predominantly of hydrogen or of a mixture of hydrogen, carbon monoxide and/or nitrogen. In most cases a reduction of the carbon monoxide content and an increase of the hydrogen content of the crude gas yielded by the partial oxidation (gasification) is necessary. The crude gas is for that reason in these cases initially subjected to a cooling and dusting as well as, if necessary, a desulfurization, made necessary in this case on account of the sensitivity to sulfur of the catalyst used for the conversion. The catalytic conversion follows thereby according to the reaction $$CO + H_2O \rightleftharpoons H_2 + CO_2.$$

This reaction is known to be exothermic and requires for adjustment of the equilibrium an addition of steam to the gas to be converted.

In order to save steam there are accordingly already in use conversion arrangements, which are provided with a moistening-demoistening system connected by means of a combined water circulation. The manner of operation of this apparatus may be sketched in briefly as follows: The gas to be converted is initially led from below into the moistener equipped with inserts as usually used in gas washing towers in which it is sprayed counter-current to suitably heated water introduced from above, whereby the gas at least partially undergoes the steam saturation necessary for the conversion. After the catalytic conversion, which can be introduced in one or more stages, the hot gas is ushered from below into the so-called demoistener, which is likewise equipped with inserts. In these, the partial condensation of surplus, non-converted steam from the converted gas follows through spraying with appropriately cooled water. For this purpose the water running out from the moistener, after appropriate cooling, is introduced into the demoistener. This introduced water is then, together with the water condensed by the converted gas, drawn off from the sump of the demoistener and pumped back in circulation to the moistener. After the necessary re-heating, it is used there again as spray water available for the gas to be converted.

Through use of such a moistener-demoistener system the necessary amount of fresh steam for the conversion is reduced. In the interest of a further reduction of the fresh steam requirement and a further optimization of the heat economy, a synthesis method must, however, take into consideration the entire process of gas treatment including the synthesis stage, and as far as possible, the there yielded process waste heat must be used by means of recovery, e.g. in the form of high-pressure steam. With the conversion of partial oxidation gas, temperatures occur which lie in the range of 400°–500° C. and offer the possibility of high-pressure steam production. With the subsequent synthesis, for example of ammonia or methanol, useful waste heat in the temperature range of about 200°–330° C. is produced by the exothermic formation reaction. This waste heat is excellently useful for the conversion of the crude synthesis gas, since the temperature of the water circuit in the moistener-demoistener system indeed, according to operating pressure, lies somewhere between 150° and 250° C.

From German Offenlegungsschrift DE-OS 29 22 293 a method is already known for the production of methanol from synthesis gas, in which the waste heat in the gas stream leaving the synthesis reactor is used in indirect heat exchange for the heating-up of the circulation water flowing from the demoistener to the moistener. Thorough investigation by the inventors has however shown that with use of such a circuit considerable difficulties can appear with the conversion of the crude synthesis gas. Namely, the steam content in the gas obtainable with this circuit before the conversion is not sufficient for the smooth execution of this reaction. With the catalysts known today there have been observed, to the contrary, undesirable secondary reactions such as the formation of soot and/or methanization.

SUMMARY OF THE INVENTION

The invention is therefore based upon the problem, in the interest of the above mentioned method optimization, of developing a method for the production of synthesis gas, which does not display the disadvantages discussed. The applicability of the method according to the invention should thereby not be limited only to the production of methanol synthesis gas, but should be valuable for all synthesis gas processes, in which the produced gas is subsequently subjected to an exothermic synthesis reaction. At the same time, the degree of usefulness of the process waste heat should be improved relative to the known methods.

This is achieved according to the invention by a method of the type described above from the prior art through the use of the following measures:

(a) from the water circulation of the moistener-demoistener system, a partial stream is branched off of the water coming from the moistener and heated in indirect heat exchange with the transformed, hot synthesis gas (synthesis product), whereupon this heated water is united again with the partial stream of water coming from the demoistener and delivered anew to the moistener;

(b) the partial stream of water flowing from the demoistener to the moistener is heated in indirect heat exchange with the converted gas before the demoisturization; and (c) the necessary fresh water is pre-warmed before entry into the water circulation of the moistener-demoistener system in indirect heat exchange with the converted gas after the demoisturization.

With the method according to the present invention, thus in contrast to the known manner of operation from DE-OS 29 22 293, the waste heat in the gas stream coming out of the synthesis reactor is not used exclusively for heating up the circulation water flowing from the demoistener to the moistener, but rather is used to heat up the water running off from the moistener. Thereby an essentially improved utilization of the waste heat available in the synthesis stage is guaranteed, since the temperature of the water running off from the moistener is about 50° C. lower than the temperature of the water running off from the demoistener.

Moreover, the manner of operation according to the present invention provides for the heating up of only a partial stream from about 40–70% by volume of the total water present in the circulation with the waste heat available in the synthesis stage. Thereby the start of conversion is facilitated and a calm operation of the apparatus is guaranteed. The required heating up of the remaining circulation water is guaranteed simultaneously through an indirect heat exchange with the converted gas before the demoisturization.

Since steam is consumed by the conversion reaction, fresh water must be continuously fed into the water circulation of the apparatus. This fresh water is heated up according to the present invention through an indirect heat exchange with the converted and demoisturized gas.

The applicability of the method according to the present invention is not limited to a fixed type of synthesis gas, but rather extends to the production of all types of synthesis gas which are subsequently subjected to an exothermic synthesis reaction. With the production of so-called methanol synthesis gas there are, however, with respect to the ratio of hydrogen to carbon oxides ($CO + CO_2$) in the synthesis gas, particular conditions to be observed. In methanol synthesis gas with a $CO_2$-content from about 2 to 5% by volume, the ratio

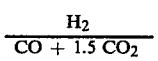

should amount to approximately 2.0 to 2.5. It has now been found that one of the mentioned conditions appropriate for methanol synthesis gas is already obtained in many cases through a partial conversion of the crude gas produced by the partial oxidation. For the case of the production of methanol synthesis gas, the method according to the present invention provides therefore an alternative manner of operation in which a partial stream of the crude gas will be branched off before entry into the moistener and led around the conversion apparatus in a bypass conduit, whereupon this branched-off gas stream according to the temperature will again be added to the converted gas either before or after the secondary cooling of the conversion apparatus. The portion of the branched-off crude gas subjected to no conversion lies thereby about 40–70% by volume of the entire amount of crude gas produced.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE represents a flow diagram for the production of methanol synthesis gas. The flow diagram shows herewith only the parts of apparatus indispensable for illustration of the present invention. Not represented on the other hand, are adjoining apparatus such as pumps, valves, filters and the like, as well as the before- and after-connected apparatus in the path of the gas, i.e. primarily the gasifier, the apparatus for washing out of $H_2S$ and $CO_2$ as well as the apparatus for execution of the synthesis reaction. These features not represented, however, all concern known apparatus, which work according to suitable methods known from the state of the art.

DESCRIPTION OF THE PREFERRED EMBODIMENT

The crude gas arriving for processing will be introduced through conduit 1. This crude gas is obtained through partial oxidation (gasification) of coal in a not represented gasification apparatus operating according to the Koppers-Totzek process. It is subjected initially to a cooling, dusting, concentration and, according to the conversion catalyst used, if necessary, also a desulfurization.

This crude gas in conduit 1, before the desulfurization, contains the following approximate gas composition:

| | |
|---|---|
| $CO_2$ | 10.12% by volume |
| CO | 62.05% by volume |
| $H_2$ | 25.6% by volume |
| remaining components ($N_2$, $H_2S$, COS, et al.) | 2.2% by volume |

The portion of the crude gas introduced amounted to about 257,000 $Nm^3$/std. From this portion about 41% by volume is branched off and led around the conversion apparatus in bypass conduit 2. The remaining gas is admitted with a temperature of about 200° C. into moistener 3, which is provided with inserts. It flows from below to above within the moistener. The irrigation or spray water necessary for the steam loading of the gas will be pumped across conduit 4 to the moistener 3. The gas, loaded to the required extent with steam, will subsequently be fed across conduit 5 and heat exchanger 6 into the reactor 7, in which the first stage of the catalytic conversion will be accomplished. The gas enters reactor 7 with a temperature of about 280° C. and leaves with a temperature of about 480° C. Across conduit 8 the partially converted gas is then admitted into reactor 10, in which the second stage of the catalytic conversion is performed. Before entrance into this reactor 10, the gas undergoes a cooling to about 315° C., by travelling across heat exchangers 9 and 6, which are disposed along conduit 8. In heat exchanger 9 a portion of the sensible heat will be used for the production of high-pressure steam, whereas in heat exchanger 6 the gas in conduit 5 coming from moistener 3 experiences a suitable heating up before entry into the first conversion stage.

After passing the second conversion stage the converted gas leaving reactor 10 possesses a temperature of about 340°–350° C. Across conduit 11 it is therefore first admitted into heat exchanger 12, in which it transfers a portion of its sensible heat to the circulation water coming from demoistener 14. Thereby the gas can subsequently, with a temperature of about 210° C., be fed across conduit 13 from below into demoistener 14, which is provided with inserts. To this, water with a temperature of about 135°–140° C. will be delivered across conduit 16, so that the gas will be cooled by the water spray in demoister 14 to about 175° C., whereby corresponding to the lowering of the temperature of the gas, its steam content is decreased through condensation.

The converted and de-moistened gas is then admitted across conduit 16 into heat exchanger 17. This is used to heat up the boiler feed water present in conduit 18, which subsequently is admitted across this conduit into heat exchanger 9. From heat exchanger 17 gas flows into conduit 19, in the course of which a further cooling of the gas ensues. Reference numerals 20–24 indicate condensate separators, in which the condensate falling out of the gas with the successive coolings is collected and which becomes drawn off across respectively connected conduits 25–29. As indicated in the flow diagram, this condensate is admitted finally back to conduit 15 and thereby placed at disposal for re-delivery into demoistener 14. With both of the last condensate separators 23 and 24, respectively connected conduits 28 and 29 discharge, however, first into conduit 30, through which the fresh water required in the process is introduced. According to the present invention, the necessary heating-up of the fresh water follows in heat exchanger 31 by indirect heat exchange with the converted and demoistened gas in conduit 19. Along this conduit are provided additionally heat exchanger 32, air cooler 33 and final cooler 34.

The heat exchanger 32 serves in this case for heating of the not represented adsorption refrigeration plant, which furnishes the required low temperature for the likewise not represented methanol wash (Rectisol-wash). Through the methanol cold wash acid gas components such as $H_2S$ and $CO_2$ are removed from the gas. The heat exchanger 32 is thereby in suitable manner included in the absorption refrigeration plant, and the circulation solution of the absorption refrigeration plant flows across conduit 35 to, and will be drawn off across conduit 36 from, heat exchanger 32.

In the course of conduit 19 the gas will be cooled to such an extent that it displays a temperature of about 40° C. after final cooler 34. Before the final cooler, bypass conduit 2 empties into conduit 19, so that the stream of converted gas will be united again with the stream of non-converted gas. The thereby resulting gas mixture has the following composition:

| | |
|---|---|
| $CO_2$ | 33.16% by volume |
| CO | 20.63% by volume |
| $H_2$ | 44.62% by volume |
| remaining components | 1.59% by volume | and, after further gas treatment, in particular $H_2S$- and $CO_2$-washing, the methanol synthesis is effected.

Meanwhile the water running off from moistener 3 is pumped in circulation across conduit 37 to conduit 15 and thereby for re-delivery to demoistener 14. According to the present invention, however, of this circulation water in conduit 37 a partial stream of about 65% by volume of the total circulation water found in the circuit is branched off and drawn off across conduit 38. In the course of this conduit heat exchanger 39 is disposed, which is brought in contact across conduit 40 with converted synthesis gas (synthesis product) having a temperature of about 270° C. This undergoes in heat exchanger 39 a cooling to about 160° C. and at this temperature is again drawn off across conduit 41. The circulation water in conduit 38 is simultaneously heated in heat exchanger 39 from about 145° C. up to about 230° C. Subsequently, this heated water is admitted into conduit 4 and placed at disposal with this temperature for re-delivery to moistener 3.

Also flowing into conduit 4 is conduit 42, through which the water running off from demoistener 14 is re-pumped in circulation to moistener 3. This water is heated from about 195° C. up to about 230° C. in heat exchanger 12 by indirect heat exchange with the converted gas, so that it is available with sufficient temperature for re-delivery to moistener 3.

Through the method according to the present invention the conversion can be managed without additional supply of fresh steam, and moreover, there will be additionally drawn off across conduit 18 about 30 t/std. high-pressure steam, which can be used for other purposes. Further energy savings result according to the present invention through the heating up of the boiler feed water, heating up of the fresh water and recovery of heat in the absorption refrigeration plant.

Finally, it should be mentioned that the two-stage conversion apparatus represented in the flow chart naturally also can be replaced by a single-stage plant. Suitable catalysts for the conversion include those normally commercially used for this purpose, which contain Fe-Cr or Co-Mo in an appropriate carrier material. The type of catalyst preferably admitted for use depends above all on the $H_2S$-content of the crude gas.

It will be understood that each of the elements described above, or two or more together, may also find a useful application in other types of processes differing from the types described above.

While the invention has been illustrated and described as embodied in a method for the production of synthesis gas, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method for the production of synthesis gas, in which the crude gas obtained through partial oxidation of carbon-containing material is subjected to a catalytic conversion in a conversion of carbon monoxide to hydrogen and carbon dioxide apparatus, which displays a moistening-demoistening system connected by means of a combined water circulation, the improvement comprising branching off a partial stream of water coming from said moistener, heating said partial stream of water by indirect heat exchange with hot product produced from the subsequent reaction of said synthesis gas, and then uniting this heated water with the partial stream of water coming from the demoistener for re-delivery to the moistener.

2. Method according to claim 1, further comprising heating up the partial stream of water flowing from the demoistener to the moistener by indirect heat exchange with the converted gas before demoisturization of said converted gas.

3. Method according to claim 1, further comprising pre-heating fresh water before entry into the water circulation of the moistener-demoistener system by indirect heat exchange with the converted gas after demoisturization of said converted gas.

4. Method according to claim 1, wherein said partial stream of water branched off of the water coming from the moistener amounts to about 40-70% by volume of the total amount of water in said water circulation.

5. Method according to claim 1 for the production of synthesis gas for methanol synthesis, in which only a partial conversion of the crude gas obtained by partial oxidation is performed, further comprising branching off a partial stream of the crude gas before entry into the moistener and adding said partial stream of crude gas to the converted gas before or after a final cooling of the converted gas.

6. Method according to claim 5, wherein about 40-70% by volume of the crude gas is branched off and is thereby not subjected to a conversion.

* * * * *